United States Patent [19]

Swearingen

[11] 3,937,022

[45] *Feb. 10, 1976

[54] SEALED ROTARY SYSTEM AND METHOD

[76] Inventor: Judson S. Swearingen, 2235 Carmelina Ave., Los Angeles, Calif. 90064

[ * ] Notice: The portion of the term of this patent subsequent to Aug. 27, 1991, has been disclaimed.

[22] Filed: May 17, 1974

[21] Appl. No.: 470,998

Related U.S. Application Data

[63] Continuation-in-part of Ser. No. 356,580, May 2, 1973, Pat. No. 3,831,381.

[52] U.S. Cl. ............................... 60/657; 277/15
[51] Int. Cl.² ......................................... F01M 9/00
[58] Field of Search ....... 277/15, 12; 184/6; 60/657, 60/671

[56] References Cited
UNITED STATES PATENTS

| | | | |
|---|---|---|---|
| 2,608,380 | 8/1952 | Rice | 277/15 X |
| 3,392,804 | 7/1968 | Lafleur | 184/6 |
| 3,452,839 | 7/1969 | Swearingen | 184/6 |
| 3,495,840 | 2/1970 | Wilk | 184/6 X |
| 3,498,620 | 3/1970 | Wiese | 184/6 X |
| 3,508,758 | 4/1970 | Strub | 277/15 |
| 3,831,381 | 8/1974 | Swearingen | 60/657 |

Primary Examiner—Samuel B. Rothberg
Attorney, Agent, or Firm—Browning & Bushman

[57] ABSTRACT

A rotary system including a rotor, a rotating shaft, and a housing surrounding the shaft and the rotor, sealing between a process zone containing the rotor and a lubricant zone being provided by a seal fluid injected into the housing between the two zones at a relatively high pressure, the seal fluid having been separated from the working fluid used in the process zone.

24 Claims, 1 Drawing Figure

U.S. Patent   Feb. 10, 1976   3,937,022
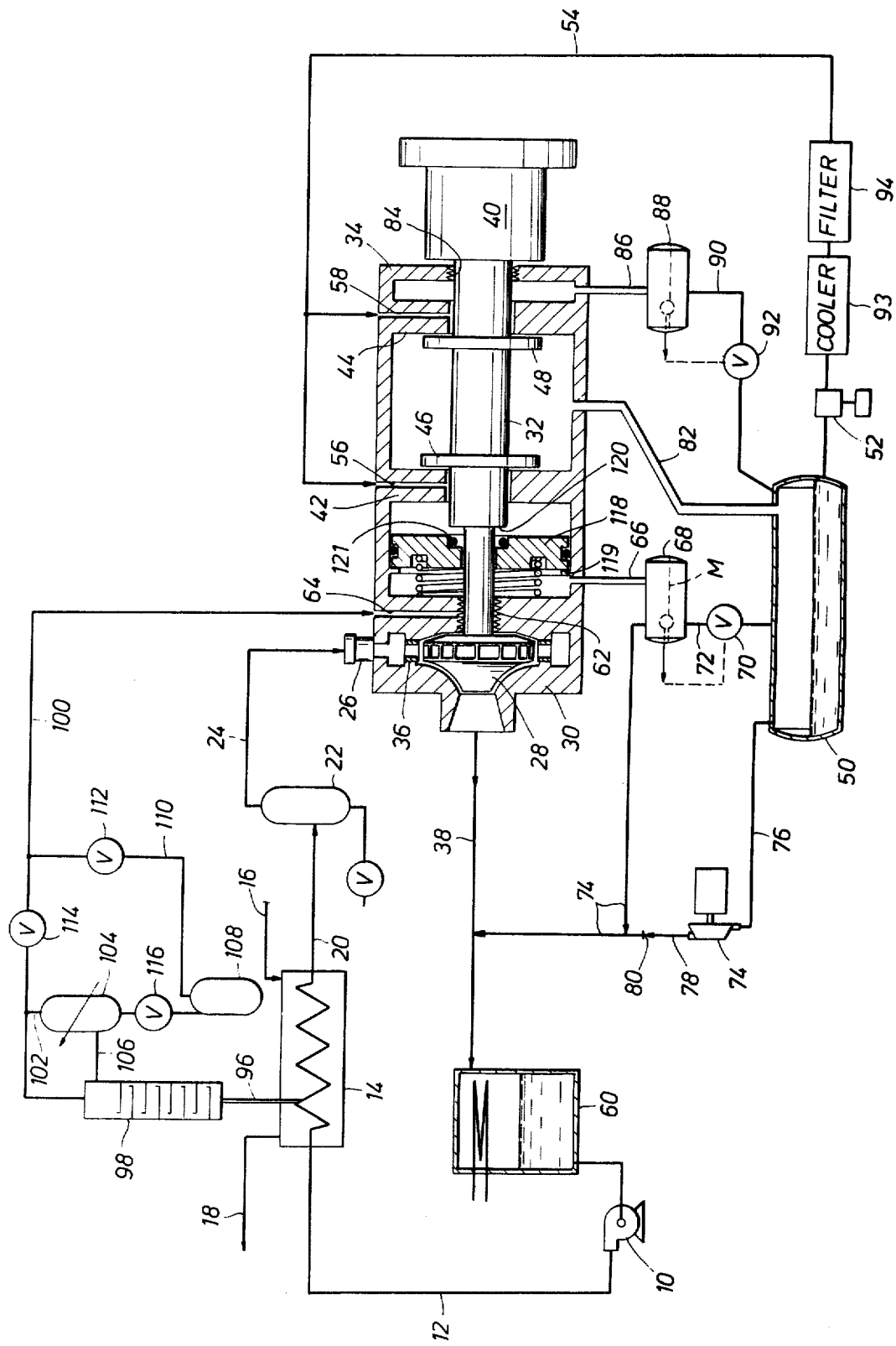

3,937,022

SEALED ROTARY SYSTEM AND METHOD

CROSS REFERENCE TO RELATED APPLICATION

This application is a continuation-in part application of Ser. No. 356,580, filed May 2, 1973 now U.S. Pat. No. 3,831,381.

BACKGROUND OF THE INVENTION

1. Field of the Invention

The present invention pertains to systems in which a working fluid is passed through a rotary machine including a rotor. More specifically, the invention pertains to power systems wherein a working fluid is heated and vaporized. The working fluid then being expanded to do work, as for example, in a turboexpander the rotor of which drives a shaft attached thereto.

In systems such as described above, the rotor and shaft are enclosed in a housing, and the housing and shaft typically have mating radial bearings and thrust bearings. Such bearings must be lubricated, and the usual way of doing this is by injecting a lubricant, under pressure, into the bearings through a lubricant passageway in the housing. The lubricant flows through each bearing, axially and circumferentially along the shaft. It is then drained from the bottom of the housing to a reservoir from which it is pumped back through the bearings again. Thus, a given quantity of lubricant is continually recycled through the system. Similarly, the working fluid is recycled. In a power system as described above, it is condensed after expansion and passed again through the heat exchanger.

There are several problems inherent in such systems particularly when the lubricant and the working fluid are chemically similar or are reactive with each other, when one is soluble in the other, or when they are otherwise incompatible in the sense that one interferes with the desired properties of the other. Two of the major problems in such cases are loss of working fluid and loss of lubricant viscosity and other properties, or conversely losses of lubricant and contamination of the working fluid thereby.

The turboexpander or other rotary machine must be sealed against atmosphere. This is generally accomplished by utilizing a seal around the shaft between the process zone, containing the working fluid and rotor, and the lubricant zone, containing the bearings and the remainder of the shaft. The seal should also serve to prevent the working fluid from leaking into the lubricant zone as this results in loss of working fluid and/or possible dissolution of the working fluid in the lubricant so as to reduce its viscosity or other necessary properties.

2. Description of the Prior Art

One previous method of sealing the process zone essentially utilized the bearing as a seal by pumping lubricant into the bearing with sufficient pressure that it would leak into the process zone and thereby seal the process zone against atmosphere while preventing leakage of working fluid into the lubricant zone. The major disadvantage of this system is that it requires a leakage of the lubricant, usually oil, into the process zone. Thus, the lubricant must be separated from the working fluid and collected so that they can be respectively recycled. Additionally, the heavy constituents of the working fluid become dissolved in the lubricant, interfering with its lubricating properties and also depleting the amount of and changing the composition of the working fluid. This is most undesirable since only the slightest amount of working fluid loss is tolerable in such systems.

Other types of seals have been used. Many of them must be lubricated by oil which leaks into the process zone introducing problems similar to those described above. In any event, there has generally been danger of leakage in one direction or the other in prior art systems regardless of what type of sealing system was used.

SUMMARY OF THE INVENTION

In the power system of the present invention a seal means, preferably a labyrinth seal, is disposed around the shaft between the process zone and the lubricant zone. A seal fluid, which may be a seal gas or vapor, is separated from the working fluid and injected into the seal at a sufficient pressure to prevent either the working fluid or the lubricant from leaking past the seal. The seal fluid flows axially away from the seal in both directions and comes into contact with both the working fluid and the lubricant. Means are provided for recovering the seal fluid from the working fluid and from the lubricant and recycling it through the seal.

The seal fluid is chosen so as to have properties which make it substantially non-reactive with the working fluid and the lubricant and preferably to be easily separable from the lubricant. The seal fluid may be separable from the lubricant by virtue of being substantially more volatile than the lubricant or by virtue of being immiscible with the lubricant. In either event, only negligible quantities of the seal fluid will dissolve in the lubricant. In the case where the seal fluid is chosen so as to be much more volatile than the lubricant, albeit soluble, the seal fluid and lubricant are drained from a contact area in the housing between the seal and the bearing closest thereto and collected in a separating chamber where most of the seal fluid is recovered at substantially the same pressure as that existing in the contact area at which pressure the seal fluid is gaseous. The seal gas is usually at least partially condensed after recovery, so that this recovery of most of the seal gas at a relatively high pressure substantially lessens the amount of work needed to condense it. The lubricant is then directed into a reservoir maintained at approximately atmospheric pressure. The small amount of seal gas dissolved in the lubricant flashes at this point and is then recovered.

In one form of the invention, the working fluid is comprised of a mixture of constituents and is vaporized in a countercurrent heat exchanger rather than in a simple boiler. Such working fluids and systems utilizing them are more fully described in applicant's copending application, Ser. No. 321,810 filed Jan. 8, 1973, now U.S. Pat. No. 3,831,381. The different constituents boil at different points in the heat exchanger depending on their relative weights, the lightest or most volatile constituents boiling at the lower temperatures. The seal fluid in this form of the invention is a seal gas, is comprised of the most volatile constituent of the working fluid, and is substantially free of the heavier or less volatile constituents. Thus, when the seal gas leaks from the seal into the process zone, it is simply allowed to mix with or otherwise become entrained in the working fluid flowing out of the turboexpander. When the working fluid is passed again through the heat exchanger, the seal gas can be recovered by a tap in the heat exchanger at a location at which the major part of the vaporized portion of the working fluid is comprised of the most volatile constituent.

As noted, the seal fluid preferably possesses properties which make it easily separable from the lubricant. Consequently, low contamination of the lubricants with negligible loss of desirable lubricating properties is encountered. Additionally, since the seal fluid is a component of the working fluid, unwanted contamination of the latter by the former is eliminated and the overall system is greatly simplified.

The preferred form of the invention also includes a seal fluid storage tank where a reserve of the seal fluid may be stored for use at start-up.

Accordingly, one object of the invention is to provide a sealing system for a rotary system which utilizes a seal fluid separated from the working fluid.

A further object of the invention is to provide automatic fractionation of the seal gas in recovering it from the power cycle working fluid.

Another object of the invention is to provide a power system using a seal fluid which is easily recoverable from both lubricant and working fluid.

Another object of the invention is to provide a sealing system using a seal fluid wherein most of the seal fluid is recovered from the lubricant and working fluid at a relatively high pressure.

An important object of the invention is to provide a power system whose working fluid is comprised of a mixture of constituents and wherein the lightest of the constituents is used as a seal gas.

Other objects and advantages of the instant invention will be made apparent by the following detailed description and the drawing.

BRIEF DESCRIPTION OF THE DRAWING

The FIGURE is a flow diagram of a sealed power system according to the invention.

DESCRIPTION OF THE PREFERRED EMBODIMENT

While the invention will be described with particular reference to a power system employing a turboexpander, it is to be understood that the invention is not so limited and is applicable to other types of systems involving sealed rotors for handling working fluids.

In the power system shown, a pump 10 is used to drive a working fluid through line 12 and into a heat exchanger 14. In the system shown, the working fluid comprises a mixture of constituent fluids such as hyrocarbons. The criteria for choosing the constituents of a working fluid of this type and for determining the proper proportion therefor is described in applicant's copending application, Ser. No. 321,810 filed Jan. 8, 1973. To the extent that the disclosure of said application, Ser. No. 321,810 is helpful in the understanding of the present invention, said disclosure is hereby expressly incorporated herein by reference.

Where the fluid comprises a plurality of constituents, the heat exchanger 14 is preferably of the countercurrent type. As the working fluid passes through the heat exchanger 14, it is vaporized and perhaps superheated by a heating fluid passing countercurrent to the working fluid. The working fluid vaporizes over a range of temperatures, the lighter constituents boiling nearer the low temperature end of the heat exchanger and the heavier constituents boiling at the high temperature end. The heating fluid may be, for example, hot water from an underground well. The heating fluid enters the heat exchanger 14 at 16 and exits at 18. After passing through the heat exchanger 14, the water is considerably cooler and is usually returned to the ground by means of another well.

The vaporized working fluid leaving the heat exchanger at 20 passes through a scrubber 22 and thence through line 24 and into the inlet 26 of a turboexpander. The scrubber 22 serves to remove any unvaporized substance in the working fluid, e.g. lubricant which by misoperation has been introduced into the working fluid. The turboexpander comprises a rotor 28 enclosed by a rotor housing 30. Integrally attached to the rotor 28 is a shaft 32. The shaft 32 is enclosed by a shaft housing 34 which, in the embodiment shown, is formed integrally with the rotor housing 30. The working fluid is directed radially into the rotor 28 by nozzles 36, passes through the rotor 28, and exits in an axial direction through line 38. As the working fluid vapor passes through the rotor 28, it expands and turns the rotor which in turn rotates the shaft 32. The rotating shaft 32 does work as by driving some type of engine illustrated diagrammatically at 40. The working fluid is then condensed by condenser 60 from which it is once again drawn into pump 10 and recycled.

The shaft 32 is supported in housing 34 by first and second bearing assemblies, 42 and 44 respectively. The annular, radially inner surfaces of bearing assemblies 42 and 44 serve as radial bearings to support the shaft 32. The opposed end surfaces of assemblies 42 and 44 cooperate with flanges 46 and 48 on the shaft 32 to form thrust bearings.

A lubricant oil from a reservoir 50 is driven by pump 52 through lubricant line 54 and injected under pressure into the bearing assemblies 42 and 44 through respective first and second lubricant passageways 56 and 58. The lubricant flows radially and axially along the shaft in both directions lubricating the bearings and then collects in the bottom of housing 34 from which it is directed back to reservoir 50 by means to be described more fully below.

In the rotor housing 30 is a labyrinth seal 62 surrounding the shaft 32 adjacent the rotor 28. The rotor housing 30, to the left of seal 62, defines a process zone containing working fluid; and the shaft housing 34, to the right of seal 62, defines a lubricant zone containing oil. The seal 62 separates these two zones. A seal fluid, which is derived from the working fluid, is injected under pressure into the seal 62 through seal passageway 64. The seal gas flows axially away from passageway 64 in both directions. The pressure of the seal gas in the passageway 64 and seal 62 is sufficiently greater than the pressures of the adjacent parts of the process zone and lubricant zone that it effectively seals the process zone against leakage to atmosphere and further prevents mixing of the working fluid and lubricant oil, since neither the working fluid nor the oil can flow past the seal 62. Additionally, the pressure of the oil in first lubricant passageway 56 is greater than the pressures of the adjacent parts of the lubricant zone so as to prevent seal fluid from flowing past the first bearing assembly 42. Thus, the area in the housing between the seal 62 and the first bearing assembly 42 becomes a contact area for seal fluid and oil.

In setting up the system, the seal fluid must be chosen so as to be non-reactive with either the working fluid or the lubricant. It should also be separable from the lubricant and compatible with the working fluid in the sense that, in the amounts present, it does not interfere with the desired characteristics of the working fluid. One way in which the seal fluid can be easily separable from the lubricant is if it is substantially lighter and more volatile than the lubricant. It will tend not to dissolve in the lubricant in the contact area. Rather, it will remain substantially in gaseous form while the oil is liquid even though the contact area pressure is substantially greater than atmosphere.

In the system shown in the drawing, apparatus for recovering such a volatile seal fluid from the lubricant is shown. A mixture vent and drain means 66 is provided in the bottom of the contact area to drain lubricant oil and seal fluid from the contact area into a separating chamber 68. The drain 66 is wide enough to serve as a vent as well as a drain so that the pressure of the separating chamber 68 is substantially the same as that of the contact area. A small amount of the seal fluid may dissolve in the contact area and in the drain 66. However, most of the seal fluid is still in gaseous form when it reaches the separating chamber 68. In the separating chamber 68, the oil settles to the bottom of the chamber. A maximum depth level of lubricant, indicated by dotted line $m$, is maintained in the chamber 68 by a float control valve mechanism 70. When the depth of the lubricant in chamber 68 begins to rise above line $m$, a float in the chamber rises and operates a mechanism which opens the valve in lubricant conduit 72 leading from the bottom of the separating chamber 68 to the reservoir 50.

If the seal fluid is sufficiently volatile, most of the seal fluid in chamber 68 will not be in solution even though it may be soluble in the lubricant. Thus, the seal gas rises to occupy the space above the line $m$. The seal fluid is removed from this space by means of a seal fluid conduit 74 leading from the top of chamber 68 to line 38. Line 38 serves as a seal fluid collecting duct where the seal fluid, originally a part of the working fluid, rejoins the expanded working fluid exiting from the turboexpander. It will be readily appreciated that the relatively light volatile nature of the seal fluid, whereby it is essentially self-separating from the lubricant at mixing area pressure, is one of the main advantages of this form of the invention and considerably reduces the amount of energy and equipment necessary to separate the seal fluid from the lubricant.

The lubricant reservoir 50 is maintained at substantially atmospheric pressure so that almost all of the small amount of seal fluid which may be dissolved in the lubricant flashes to its gaseous form in the reservoir 50 and collects in the upper part thereof. This seal fluid is then drawn off through line 76 by compressor 74 which also serves to maintain reservoir 50 at substantially atmospheric pressure. The compressor 74 compresses the seal fluid to essentially the pressure of line 38. This seal fluid is then directed into line 38 via line 78, one way valve 80 and line 74.

At this point, only the smallest traces of seal fluid might remain in the lubricant in the bottom of reservoir 50. These traces are small enough not to represent a serious loss of the seal fluid. These traces ordinarily would not seriously interfere with the viscosity of the oil. However, by choosing a lubricant which is slightly more viscous than necessary, it becomes ideal in operation when the traces of seal fluid are present.

Lubricant which flows to the portion of shaft housing 34 between the two bearing assemblies 62 and 64 flows through lubricant vent and drain means 82 into the reservoir 50. The portion of housing 34 opposite drain 82 is vented to atmosphere through labyrinth seal 84. Lubricant from this part of the shaft housing 34 is collected in auxiliary lubricant collection means and also delivered to the reservoir 50. The auxiliary lubricant collecting means comprises drain 86, drum 88 and conduit 90, with conduit 90 being controlled by a float control valve mechanism 92. The purpose of the auxiliary lubricant collecting means and particularly of the valve 92 is to prevent air which may be present in the shaft housing 34 and seal fluid in the lubricant reservoir 50 from mixing, as this could cause loss of seal fluid, contamination of seal fluid, and/or explosions. The oil in the bottom of reservoir 50 is substantially free of seal fluid, except for the slight traces mentioned above, and is pressurized by pump 52 and driven through cooler 93, filter 94 and line 54 to the lubricant passageways 56 and 58.

It will be understood that the apparatus for separating the seal fluid from the lubricant, as described above, pertains to a highly volatile seal fluid which exists in gaseous form at the super-atmospheric pressure of the contact area and separating chamber. A seal fluid which is somewhat less volatile, but still substantially more volatile than the lubricant, can be used with similar apparatus. For example, means might be provided for heating the separation chamber 68 slightly to cause the seal fluid to vaporize and separate from the lubricant. The lubricant, being substantially less volatile, would remain in liquid form at the slightly elevated temperature.

It will be appreciated that if the seal fluid is substantially more volatile than the lubricant, allowing easy separation by means of vaporization, a substance which is soluble in the lubricant can be used for the seal fluid if desired. On the other hand, an alternative way of providing a seal fluid which is readily separated from the lubricant, is to choose a seal fluid which is immiscible in the lubricant. For example, if the basic working fluid constituent were acetone and the lubricant a hydrocarbon, a small amount of methanol could be added to the working fluid to serve as a seal fluid. The methanol would not interfere with the desired properties of the acetone and would be immiscible in the hydrocarbon lubricant. Where the seal fluid is immiscible in the lubricant, it can, if desired, have a boiling point which is fairly close to that of the lubricant, or it can even be less volatile than the lubricant. Under these circumstances the seal fluid would be separated from the lubricant by means of a phase separation technique, such as are well known in the art. Of course, a highly desirable seal fluid would be one which is both immiscible in the lubricant and also substantially more volatile than the lubricant. In any event, the apparatus for separating the seal fluid from the lubricant will include means for delivering the separated seal fluid into the seal fluid collecting duct 38.

The fluid which collects in the seal fluid collecting duct 38 is comprised of working fluid which has been expanded in the turboexpander and seal fluid which has been removed from chamber 68 and reservoir 50. These fluids, including the seal gas, may simply be considered the "working fluid" at this point since the seal fluid is actually comprised of part of the working fluid. The condenser 60, pump 10 and line 12 comprise a working fluid line which liquefies the working fluid in duct 38 and directs it back through heat exchanger 14.

The seal fluid is separated from the remainder of the working fluid by means of a tap 96 in the heat exchanger 14. In some cases the seal fluid may have the same composition as the working fluid, and this will, of course, be true if the working fluid comprises a pure fluid. If the working fluid consists of a plurality of constituent fluids, the seal fluid may be comprised of any constituent or group of constituents which can be easily separated from the working fluid and preferably also from the lubricant. If the working fluid, as designed for use as such, does not contain a constituent which is suitable for use as the seal fluid, a suitable fluid may be added to the original working fluid formula. Of course, this seal fluid must be chosen so that it is non-reactive and compatible with the rest of the working fluid in the amounts present.

Where the working fluid comprises a plurality of constituent fluids, the seal fluid is preferably comprised of either the most or least volatile constituent or constituents because these are the easiest to separate from the remainder of the working fluid. There is a particular advantage to using a seal fluid which is comprised of the lightest or most volatile constituent or constituents and free of the heavier ones. This is because the most volatile constituent will usually also be substantially more volatile than the lubricant. This, as explained above, is one way of providing the separability required for practicing the preferred forms of the invention. However, it should be understood that any constituent of the working fluid having the desired seal fluid characteristics may be used. In the example given above in which the working fluid was comprised of acetone plus a small amount of methanol, the seal fluid, methanol, could be the least volatile of the two working fluid constituents depending on the pressure.

In order to separate from the working fluid a seal fluid which is the lightest constituent, a tap 96 is located in the heat exchanger 14 at a point near the cool end of exchanger 14 at which the major part of the vaporized portion of the working fluid being heated is comprised of the very lightest or most volatile constituent or constituents of the working fluid, i.e. that constituent which is to be used for seal fluid. If a constituent other than the lightest one is to be used, the tap 96 is located in the exchanger 14 at the appropriate point. It will be understood that the tap 96 would be sized so as to allow the proper amount of the seal fluid constituent to escape and that some of this constituent will probably remain in the working fluid. Accordingly, in preparing the working fluid, it is necessary to take into consideration the fact that some of this constituent will be extracted from the working fluid and used as seal fluid. Thus, the formula for the working fluid will have to include a proper amount of this constituent so as to provide the desired amount of seal fluid and leave the remainder of the working fluid with the desired composition after the extraction of the seal fluid.

To process a seal fluid which is the most volatile constituent of the working fluid, the tap 96 is connected to the bottom of a fractionating tower 98 and is also sized to allow reflux from the bottom of tower 98 to flow therethrough by gravity into the heat exchanger 14 against the stream of seal gas in tap 96. The seal gas flows upwardly through the tower 98 and is further stripped of the heavier constituents of the working fluid and other impurities by a reflux fluid flowing downwardly through the tower. The seal gas emerging from the top of tower 98 is thus substantially free of the heavier or less volatile constituents of the working fluid, i.e. any traces of the heavy constituents are so slight as to represent negligible interference with the properties of the lubricant when the two are mixed in the contact area. The seal gas then passes through seal fluid line 100 to the seal passageway 64. The seal fluid line 100 has a segment 102 which directs some of the seal fluid into a condenser 104 where it is liquefied. A portion of this liquefied seal fluid is directed to the top of the fractionating tower 98 by reflux line 106 and is used as the reflux fluid for the tower. Another portion of the liquefied seal fluid from condensor 104 is stored in a seal fluid storage tank 108. This stored seal fluid is used as a reserve and can be released into seal fluid line 100 through reserve line 110 connected downstream of the condenser 104 to provide the necessary seal during start-up of the system.

A valve 112 in reserve line 110 may be operated either manually or automatically to open reserve line 110 during start-up and to close the line 110 when sufficient seal gas is being released from the fractionating tower 98. Similar valves 114 and 116 can be used at shutdown to respectively close line 100 upstream of line 110 and the passageway between the condenser 104 and the tank 108.

It will be apparent that the apparatus for separating the seal fluid from the working fluid may require some modification if the constituent to be used is other than the most volatile. For example, the tap 96 would have to be located nearer the hot end of exchanger 14 to collect a less volatile constituent. It will also be apparent that if the working fluid is comprised of a single constituent, the apparatus can be considerably simplified.

In order to prevent loss of seal fluid or working fluid during shutdown of the system, a seal off valve 118 is provided. During operation of the system, the seal off valve 118 remains in the position shown. At shutdown, it is moved to the right so that O-ring 121 bears against a shoulder 120 on the shaft 32 so that no fluid from the contact area can leak past the shoulder. Valve 118 can be operated mechanically or it can be operated automatically by virtue of the fact that at shutdown the pressure in lubricant passageway 56 drops so that the pressure in the contact area is operative to push the valve 118 to the right and into engagement with shoulder 120. The liquid trapped in chamber 68 and the check valve 80 together prevent any bypass around the seal of valve 118. Stop 19 prevents valve 119 from blocking mixture vent and drain means 66 during operation.

I claim:

1. In a system of the type wherein a working fluid is passed through a rotary machine, wherein said machine comprises a rotor housing, a rotor within said rotor housing integrally connected to and, in operation, rotating with a shaft on a common axis of rotation, wherein said shaft extends from said rotor housing and is supported by a first bearing assembly externally of the rotor housing, and wherein a lubricant is injected under pressure into said first bearing assembly and caused to flow through the first bearing assembly around said shaft and therefrom axially toward said rotor: the improvement which comprises seal means in said rotor housing surrounding a portion of said shaft adjacent said rotor for sealing said rotor housing around said shaft, means for separating seal fluid from said working fluid, means for injecting said separated seal fluid into said seal means around said shaft intermediate the axial extremities of the seal means, said seal fluid being non-reactive with said working fluid and said lubricant, the interior of said rotor housing defining a process zone on one side of said seal means containing said working fluid under a working pressure lower than said seal fluid as injected, a shaft housing enclosing said shaft adjacent said seal means and defining a lubricant zone on the other side of said seal means, said lubricant zone including a contact area between said seal means and said first bearing assembly and maintained under pressure lower than the pressure of said seal fluid as injected, whereby said seal fluid will leak into both said process zone and said contact area and will prevent intermingling of said working fluid and said lubricant.

2. A system according to claim 1 wherein said seal fluid is separable from said lubricant, said system further including means for recovering said seal fluid from said lubricant and for recycling said seal fluid through said seal means.

3. A system according to claim 2 wherein said seal fluid is substantially more volatile than said lubricant.

4. A system according to claim 3 wherein the pressure of said contact area is such that said seal fluid is in a gaseous state and said lubricant is in a liquid state in said contact area.

5. A system according to claim 4 wherein the pressure in said first bearing assembly is higher than the adjacent pressures in said lubricant zone whereby said seal fluid is prevented from flowing axially past said first bearing assembly.

6. A system according to claim 4 including a separating chamber, mixture vent and drain means connecting said contact area with said separating chamber such that said lubricant and said seal fluid can flow from said contact area into said separating chamber, said separating chamber being maintained at substantially the same pressure as said contact area, means for limiting the level of said lubricant in said separating chamber to a predetermined level less than the full volume of said separating chamber, whereby the major portion of said seal fluid separates from said lubricant in said separating chamber and occupies the space above said maximum depth level in said separating chamber, and means for removing said seal fluid from said space.

7. A system according to claim 6 further comprising a lubricant reservoir, a lubricant conduit connecting said lubricant reservoir to said separating chamber below said maximum depth level, and means for selectively opening said conduit when said lubricant tends to rise above said maximum depth level to allow flow of lubricant from said separating chamber to said lubricant reservoir, wherein the pressure in said lubricant reservoir is substantially lower than the pressure in said separating chamber whereby any of said seal fluid which is contained in liquid form in the lubricant flowing through said lubricant conduit flashes to a gaseous state in said lubricant reservoir and collects in an upper part of said reservoir, said system further comprising means for drawing said seal fluid from the upper part of said reservoir.

8. A system according to claim 6 wherein said seal fluid removing means comprises a seal fluid conduit connecting said space above said maximum depth level in said separating chamber with a seal fluid collecting duct of lower pressure than the pressure in said separating chamber.

9. A system according to claim 7 wherein said seal fluid removing means comprises a seal fluid conduit connecting said space above said maximum depth level in said separating chamber with a seal fluid collecting duct of lower pressure than the pressure in said separating chamber but greater than the pressure in said lubricant reservoir, and wherein said seal fluid drawing means comprises a compressor operative to draw said seal fluid from said upper part of said reservoir and direct said seal fluid into said seal fluid collecting duct while increasing the pressure of said seal fluid from that of said reservoir to that of said duct.

10. A system according to claim 7 wherein said shaft housing has lubricant vent and drain means adjacent said first bearing assembly opposite said contact area and leading to said reservoir.

11. A system according to claim 10 including a second bearing assembly supporting said shaft, said lubricant vent and drain means being located between said bearing assemblies.

12. A system according to claim 11 wherein said shaft housing has a vent located adjacent said second bearing assembly opposite said lubricant vent and drain means, said system further including auxiliary lubricant collection means between said second bearing assembly and said vent and connected to said reservoir for collecting said lubricant and returning it to said reservoir and having a control valve mechanism operative to substantially prevent exchange of gases between said reservoir and said shaft housing through said auxiliary lubricant collection means.

13. A system according to claim 2 wherein said seal fluid is immiscible in said lubricant.

14. A system according to claim 13 wherein said means for recovering said seal fluid includes phase separation means for separating said seal fluid from said lubricant.

15. A system according to claim 1 wherein said working fluid is comprised of a plurality of constituents and said seal fluid is comprised of a lightest one of said constituents.

16. A system according to claim 8 wheein said working fluid is comprised of a plurality wherein constituents, said rotary machine is a turboexpander operative to expand said working fluid, and said seal fluid is comprised of a lightest one of said constituents, and wherein said seal fluid collecting duct is in equal pressure communication with the outlet of said turboexpander.

17. A system according to claim 15 wherein said rotary machine is a turboexpander operative to expand said working fluid, said system further including a countercurrent heat exchanger for vaporizing said working fluid, feed means for feeding said vaporized working fluid into the inlet of said turboexpander, said heat exchanger having tap means located at a point in said heat exchanger at which a major part of a vaporized portion of the working fluid is comprised of said lightest constituent, said tap means allowing escape of said vaporized portion, and a seal fluid line communicatively connecting said tap means with said means for injecting said seal fluid.

18. A system according to claim 17 wherein said seal fluid line includes a seal fluid condenser between said tap means and said seal fluid passageway for liquefying at least a fraction of the vaporized portion of said working fluid escaping through said tap means.

19. A system according to claim 18 further including a seal fluid storage tank connected to said fluid condenser for storing a quantity of said liquefied fraction to serve as a seal fluid reserve.

20. A system according to claim 19 further including a reserve line connecting said seal fluid storage tank to said seal fluid line downstream of said seal fluid condenser, and valve means in said reserve line operative to open and close said reserve line.

21. A system according to claim 16 further including a fractionating tower in said seal fluid line immediately adjacent said tap means and having its lower end connected to said tap means, a reflux line connecting a liquid containing portion of said seal fluid condenser to the upper end of said fractionating tower, and wherein a segment of said seal fluid line further connects the upper end of said fractionating tower to a vapor containing portion of said seal fluid condenser.

22. A system according to claim 16 including a countercurrent heat exchanger for vaporizing said working fluid, a working fluid line connecting said duct and said outlet end of said turboexpander to a cool end of said heat exchanger, said working fluid line including a working fluid condenser for liquefying said seal fluid and the working fluid flowing from the outlet end of said turboexpander; and a working fluid pump for directing said working fluid, including said seal fluid, through said working fluid line to said cool end of said heat exchanger.

23. A system according to claim 1 wherein said rotary machine is a turboexpander operative to expand said working fluid and thereby drive said shaft.

24. A system according to claim 1 wherein said working fluid is comprised of a plurality of constituents and said seal fluid is comprised of a heaviest one of said constituents.

* * * * *

UNITED STATES PATENT AND TRADEMARK OFFICE
CERTIFICATE OF CORRECTION

PATENT NO. : 3,937,022
DATED : February 10, 1976
INVENTOR(S) : Judson S. Swearingen It is certified that error appears in the above-identified patent and that said Letters Patent are hereby corrected as shown below:

| COLUMN | LINE | |
|---|---|---|
| 8 | 49 | Delete "19" and substitute therefor --119--. |
| 8 | 49 | Delete "119" and substitute therefor --118--. |
| 10 | 43 | Delete "wheein" and substitute therefor --wherein--. |
| 10 | 44 | Delete "wherein" and substitute therefor --of--. |
| 11 | 2 | After "said", insert --seal--. |

Signed and Sealed this

Sixth Day of July 1976

[SEAL]

Attest:

RUTH C. MASON
Attesting Officer

C. MARSHALL DANN
Commissioner of Patents and Trademarks